United States Patent [19]
Bond et al.

[11] 3,951,948
[45] Apr. 20, 1976

[54] SIZE CLASSIFIED CEREAL STARCH GRANULES

[75] Inventors: John L. Bond, Dublin; Saul Rogols, Circleville; John W. Salter, Westerville, all of Ohio

[73] Assignee: A. E. Staley Manufacturing Company, Decatur, Ill.

[22] Filed: June 12, 1974

[21] Appl. No.: 478,563

Related U.S. Application Data

[62] Division of Ser. No. 180,588, Sept. 15, 1971, abandoned.

[52] U.S. Cl. .................... 260/233.3 A; 106/130; 260/9
[51] Int. Cl.² ......................................... C08B 31/00
[58] Field of Search .......... 260/233.3 A, 9, 233.3 R; 106/130

[56] References Cited
UNITED STATES PATENTS

| | | | |
|---|---|---|---|
| 2,417,611 | 3/1947 | Pierson | 260/233.3 A |
| 3,065,222 | 11/1962 | Bullock et al. | 260/233.3 A |
| 3,705,046 | 12/1972 | Speakman | 260/233.3 A |
| 3,832,342 | 8/1974 | Rutenberg et al. | 260/233.3 A |

*Primary Examiner*—Lewis T. Jacobs

[57] ABSTRACT

A wet process for separating certain cereal starch granules according to size, and the new large granule cereal starch made thereby. Barley, rye and wheat starch may be processed according to the invention, and may bbe subjected to further modifications, such as cross-linking, to further improve the properties of the product.

Native colloid, prime grade wheat starch slurry is pumped through a series of cyclone-type separators in a wet process system to separate the large granule portion from the small granule portion. These small granules range in size from about 3–10 microns.

A recirculation system is provided to get a starch granule fraction comprising 99% by weight large granules ranging in size from about 12 microns to 40 microns, and at least 22% comprising granules which are 22 microns or larger in size. This product has a very large portion of large granules in comparison to prime grade wheat, which normally comprises about 2.5% granules which are 22 microns or larger. The uniformly sized large starch granules derived by the separation process of the invention are particularly useful in anti-offset lithograph powders, and as protective particles in the sensitized surface coating of non-carbon duplicating paper which normally contains microencapsulated ink. In the latter application, the uniform sized cereal starch particles replace scarce arrowroot starch particles to prevent premature rupture of the ink-containing capsules during handling of the sensitized paper. There is also evidence to show an improvement in baked goods attributable to the use of reconstituted flours incorporating the large granule starch of the invention.

The smaller, uniformly sized starch granules also have more uses because of their uniform smaller size, particularly as a substitute for rice starch. Wheat, barley and rye starch are suitable base starch materials because they are easily separated into small and large particle fractions. Wheat is the most readily available of these cereal grains, and is therefore the presently preferred base starch.

14 Claims, 9 Drawing Figures

SIZE CLASSIFIED CEREAL STARCH GRANULES

This is a division of application Ser. No. 180,588, filed Sept. 15, 1971, now abandoned.

BACKGROUND OF THE INVENTION

This invention provides a new means for expanding the possible uses of certain cereal starches, particularly wheat starch, and makes use of their generally spheroidal granule form. A wet process separation is used to obtain starch granules of uniform size which are useful in a wider range of applications. In particular, this product is used as a substitute for the more expensive and exotic root starch, arrowroot. In addition, the small granule cereal starch by-product which results from the separation process may be used as a rice starch substitute, and to improve the texture of certain bakery products in which a fine-grain texture is desirable.

DESCRIPTION OF THE PRIOR ART

In the past, some attempts have been made to separate wheat starch granules according to size, but such separation techniques were usually accomplished by air classification of the initial flour, or otherwise effected on the total wheat starch in the dry state. One such method has been described by J. W. Knight, in his work entitled, *The Chemistry of Wheat Starch J Gluten*, published by Leonard Hill, London, (1965). According to Knight, the dry separation is only partially successful. Also, Anderson and Griffin have published a method for separating gluten and starch from flour, but no mention is made here of a wet-process separation of the wheat starch granules according to size (Anderson, R. A., and Griffin, E. L. *Die Starke*, 6 (14), pp. 210–212, (1962)).

Hoseny et al. made use of a screening technique to obtain a small granule wheat starch fraction for testing at the Hard Winter Wheat Laboratory, Manhattan, Kansas (Cereal Chemistry, 48:191–201, 1971). They observed no change in gelatinization temperature when comparing prime grade wheat (mixed granule sizes) to small granule wheat. The performance of these samples in breadmaking was also judged to be the same, so it was concluded that granule size did not govern the breadmaking potential of a wheat starch. Sollars, et al., however, speculated that starch granule size *does* play a dominating role in performance of reconstituted flours in baking (See Sollars et al., *Wheat and Starch in Flour*, Cereal Chemistry 48:397–410, 1971, page 408). The method used by Hosney et al. to obtain his small granule wheat starch incorporated a screening technique which apparently produced a combination of small granule starch particles, fragmented particles, and pentosans. No size is stated, but it would appear from Hosney et al.'s photomicrographs that a certain amount of larger granule particles did find their way into the product (Ibid: FIG. 1, "SGW", page 196).

In a recent collection work edited by Y. Pomeranz, entitled, *WHEAT: Chemistry and Technology*, published by The American Assn. Cereal Chemists, St. Paul, Minn. (1971), [Chapter 7, "Carbohydrates", authored by B. L. d'Applonia and K. A. Gilles, pp. 332, 336, 344], the microscopic appearance of wheat starch granules was described in detail. The presence of two strikingly different granule types was noted: large "lenticular" granules most with a diameter of 20 to 35 microns; and small spherical granules with diameters largely in the range of 2 to 10 microns. It was also there reported that the larger granules in wheat starch, although representing only 12.5% of the total number, account for most of the weight and the larger portion of the surface. Reporting on the physical properties of wheat starch, the author reported that swelling of granules and loss of birefringence was observed to occur in larger granules first. The gelatinization of this wheat starch was observed to cover a range of temperatures.

F. J. Fontein described a method of refining a starch suspension in U.S. Pat. No. 2,642,185, issued June 16, 1953. Although on the surface his method appears somewhat similar to applicants', there are some significant differences. For example, Fontein is only interested in obtaining starch granules which are less than seven microns in size. The starch granules which are larger are apparently withdrawn and subjected to further processing. Those granules which are about 20 microns in size and larger are the very ones which applicants find most important as a commercial product. The smaller particles below 12 microns in size are merely a useful by-product of applicant's separation system.

Fontein's process uses a cyclone separation system in which the starch granules below 7 microns are collected and then further refined to remove substantially all the more coarse particles. The whole object of the Fontein method is to obtain a refined starch having uniform granules less than 10 microns in size, and preferably smaller than 7 microns.

Fontein's circulation system takes the overflow from the top, or base aperture, of his hydrocyclone, and feeds this to a second hydrocyclone. The overflow from the top (base) aperture of the second hydrocyclone is collected as a fine granule product (smaller than 7 microns).

Applicants' method, in contrast, requires that the input into their first hydrocylone be a prime grade, washed wheat starch slurry at a very specific viscosity level. The underflow, from the apex opening of this first hydrocyclone, is collected and fed as the feed into a second hydrocyclone, so that the feed to the second hydrocyclone is primarily a large granule, partially separated starch slurry. The viscosity level is again adjusted very carefully before the underflow is fed into the second hydrocyclone. The desired product is the underflow from the second hydrocyclone.

The initial input into the system of the invention is prime grade, washed wheat starch slurry, so the overflow fractions are also quite uniform in size, having a particle size ranging from about 3–12 microns. This overflow fraction is also collected in each instance, and can be used in those applications where a small granule cereal starch is used. This small granule by-product may be used as a substitute for small granule rice starch, for example.

The process of this invention produces an extremely good large granule starch product which is particularly suited for use as a protective particle in a surface coating for carbonless duplicating paper, and which has certain desirable physical characteristics which distinguish it from the small granule product. The large granule product may be further modified to enhance its desirable properties. For example, its heat stability may be improved by some cross-linking, as more fully set forth below.

U.S. Pat. No. 2,504,962 describes a process for separating starch from flour by means of a series of screens. However, no mention is made here of wet process separation of starch granules according to size. U.S. Pat. No. 3,489,605 issued Jan. 13, 1970 describes an apparatus for gluten separation from starch. Again, the object is to remove starch in toto without any attempt to classify the starch granules according to size. U.S. Pat. No. 3,354,046 issued Nov. 21, 1967 describes the use of chemicals or enzymes as an aid in the filtration of starch products.

Dutch Patent Specification No. 7005045, opened for public inspection Oct. 12, 1970 (based on U.S. Ser. No. 814,336, filed Apr. 8, 1969) describes a pressure sensitive coating on a duplicating paper. The coating includes microencapsulated ink particles which, when ruptured by the pressure of an image writing instrument, will transfer a duplicate image to an adjacent paper surface.

Such specially coated paper requires a protective material having a relatively uniform micro-particle size slightly larger than the encapsulated ink particles to prevent the premature rupture of the ink containing micro-capsules in the paper coating during storage or handling of the coated paper. The specification discloses various starch particles as candidates for the protective material, and states that arrowroot starch granules are preferred because of their uniform relatively large granule size in the order of 25–50 microns.

Wheat starch granules were not rated as well as arrowroot because the granules range in size from 2–35 microns. Barley and rye were not even listed or rated in the subject Dutch specification. No advantage was apparently seen in either a thermal or chemical treatment for the disclosed protective starch granules.

In summary, one would conclude that the best protective material for pressure sensitive duplicating paper is native arrowroot starch granules, and that wheat starch would be fourth choice, after potato and sago. Obtaining a sufficient supply of arrowroot starch presents a serious obstacle, because it is obtained primarily from the root of a plant (Maranta arundinacea) grown on the island of St. vincent in the West Indies. The arrowroot starch so produced is used mostly in specialty foods for children and invalids, and is relatively expensive.

There is, therefore, a definite need for a less expensive protective material for pressure sensitive duplicating paper. The material should meet all the requirements set forth above, and should be a material which is relatively plentiful. To the best of applicants' knowledge, no prior efforts have been made to obtain a uniform, large granule starch product from a prime grade cereal starch slurry such as wheat, barley or rye, particularly with the goal in mind to obtain a product having 99% by weight of the granules ranging in size from 12–40 microns, and at least 22% of the granules about 22 microns in size, or larger.

The very recent collection work mentioned above (Wheat: Chemistry and Technology) describes the effects to be obtained by intermolecular bonding of starch granules (p. 344). However, there is no mention here of any difference if the granules have been first size classified. The main observed effect was apparently inhibition of granule swelling, and prevention of breakdown of the gelatinized pastes made from such cross-linked starch granules. The extent of cross-linking suggested here is in the order of about one cross link per 2,000 glucose units.

The use of the hydrocyclone separator has been described more recently in the literature, and in patents other than Fontein, U.S. Pat. No. 2,642,185, but it is believed that the device has never been used before in a system having a flow pattern such as that of the subject invention with the purpose of separating and saving a large granule, prime grade starch, relatively free of impurities, which is particularly useful as a protective material in pressure sensitive microencapsulated paper coatings. U.S. Pat. No. 3,251,717, Honeychurch et al., issued May 17, 1966 on an application filed Oct. 15, 1962, discloses the use of hydrocyclones in combination with centrifuges to remove soluble material in a mill stream thickening step in a cornstarch wet milling process. There is no intent or suggestion here that the starch granules be *also* separated according to size. In Whistler et al., Op. Cit, Vol. II, p. 42, the hydrocyclone separation is also described, but the purpose is to separate heavier endosperm and fiber particles from the lighter germ containing starch. The germ is then washed to remove starch, with no attempt being made to further separate the starch granules according to size.

In summary, the object of most of the prior art has been to improve the existing methods of separating starch from the gluten and fibers of the raw grain kernels. For wheat wet milling, the most widely practiced method has been to first form a dough of wheat flour plus water in the correct porportions to produce a wet gluten which is typically ductile, tenacious and elastic. The wet gluten is then formed into a dough, and the starch separation of the gluten from *all* the starch without regard to granule size is effected. The Fontein patent mentioned above goes a step further and collects uniformly small starch particles less than 10 microns in size, but ignores the large size particles.

SUMMARY OF THE INVENTION

Applicants' invention is directed to a specially processed cereal starch comprising starch granules in which 99% by weight of the product comprises starch granules above 12 microns in size and at least 22% of these granules are larger than 22 microns. The invention is also directed to the wet process separation of starch granules to obtain this large granule starch. A series of hydrocyclone separators are used in combination with a centrifugal separator to effectively separate a native colloid prime grade cereal starch slurry into two distinct portions to obtain separate granule size classifications. It is important to the success of the system that the method be performed on prime grade starch slurry which has *not* been subjected to a drying step, and then reslurried. The system obtains all the advantages of a wet process system, and starch granule separation into two uniform size classifications is obtained. Approximately 99% by weight of the starch granules 12 microns or over are separated from the smaller granule sizes, and about 55% by weight of these larger granules comprise granules which are 22 microns, or larger.

The possible uses for wheat starch is significantly increased by the provision of a larger granule special wheat starch. This new starch is particularly useful as a replacement for the relatively scarce and expensive arrowroot starch used as a protective material in coated carbonless copy paper which use micro-enncapsulated ink to form copy images. The new large granule wheat starch can also be used to replace arrowroot starch granules in an anti-offset lithographic powder, which is spread or sprayed on freshly lithographed paper sheets to permit stacking without image blurring or transfer.

DETAILED DESCRIPTION OF THE INVENTION

The drawings serve to illustrate the inventions more fully.

Figure 1:
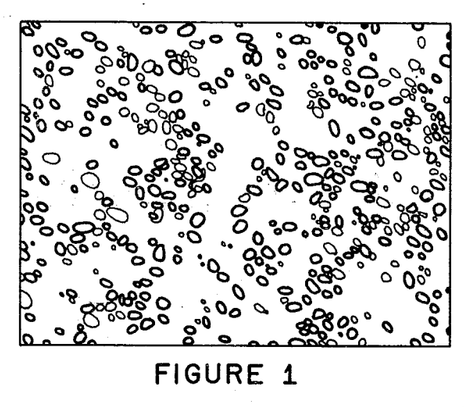
FIG. 1 of the drawings is a sketch made from a photomicrograph enlarged 100X showing typical arrowroot starch granules.
Figure 4:
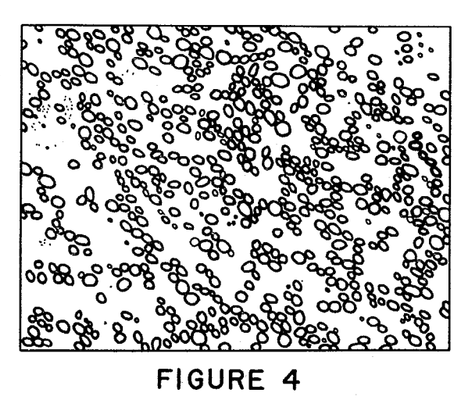
FIG. 4 is a sketch made from a photomicrograph enlarged 100X and shows the large granule wheat starch of the invention.

The most striking point to be noted in the drawings, particularly FIGS. 1 and 4, is that the large granule wheat starch obtained by the invention is very similar in shape and size to the much more scarce native arrowroot starch. In fact, the large granule wheat starch particles shown in FIG. 4 appear to be *more* spheroid than arrowroot. When the product is to be used as a protective particulate coating for microencapsulated ink coated papers, it is believed that the spheroid granule shape of the large wheat granules makes the product particularly effective.

Dutch Patent Specification No. 70/05045 filed Apr. 8, 1970, based on U.S. Pat. application Ser. No. 814,336, filed Apr. 8, 1969 is directed to a specially coated paper which responds to typing pressure to produce an image on a second, underlayer copy paper. Chromogenic ink capsules are coated on the back of the paper to receive the original typed or written impressed numbers or letters, or other symbols. When these chromogenic ink capsules are ruptured, they release and transfer the image to the specially treated front surface of the copy paper, and an accurate copy of the topsheet is obtained.

This specially treated paper requires a protective material in the coating which includes the microencapsulated ink to prevent premature rupture of the pressure sensitive capsules during handling. The subject Dutch specification teaches the use of starch particles, particularly arrowroot, because it has granules of uniform large size. Examples using corn, wheat, and potato starch are given, but it is clear from a full reading of the disclosure that the more effective starch particles are arrowroot. Commercially, the other starches mentioned are not even used. A serious problem exists in producing the pressure sensitive copy paper described in the subject application because of the world wide shortage of arrowroot starch. The shortage is so critical that applicants' assignee has sponsored trips to the island areas in the Carribbean where arrowroot is grown in an attempt to convince the landowners there to grow arrowroot for special uses. Wheat starch, on the other hand, is relatively plentiful, and can provide an economical and readily available replacement for arrowroot if the desirable properties of arrowroot starch can be duplicated or surpassed.

Others have attempted to separate previously dried wheat starch into a large granule portion and a small granule portion using wet processing and centrifugal separators. These attempts were unsuccessful, apparently because of some effect on the prime grade wheat starch caused by the drying process.

Applicants discovered unexpectedly that it is possible to separate a large granule wheat starch from original prime grade, native colloid mixed granule size wheat starch slurry which has *not* been dried. Such a slurry is a native colloid, having resulted directly from the actual wheat starch wet milling process *before* any drying step. It has been found that to be successful, applicants' separation process must have an input stream which is purified native colloid prime grade wheat starch, as nearly free of salt, fiber and gluten as possible. This is of great importance, because foreign materials such as salt, fiber and gluten can prevent the cyclone separator from functioning properly to provide a large granule starch portion.

Another important consideration to obtain a large granule wheat starch which is a "match" for arrowroot starch is the requirement of having at least two cyclone separators in series so that the underflow from the first cyclone separator provides the feed to the second cyclone separator. The viscosity of the input slurry to both cyclone separators should be carefully adjusted within narrow limits to insure the correct functioning of the cyclone separators. This arrangement has been found to be necessary to obtain approximately the same percentage of large wheat starch granules as is normally found in the much scarcer arrowroot starch.

Native wheat starch is relatively plentiful, and has a wide range in granule size from 2 to about 35 microns. Most of the granules fall at the upper and lower ends of the size range, with very few intermediate sized granules, so that wheat starch becomes a natural candidate for separation of the starch granules according to size. It is also contemplated that native rye and barley starch can be separated into a large granule portion and a small granule portion using the teachings of the invention.

Figure 8:
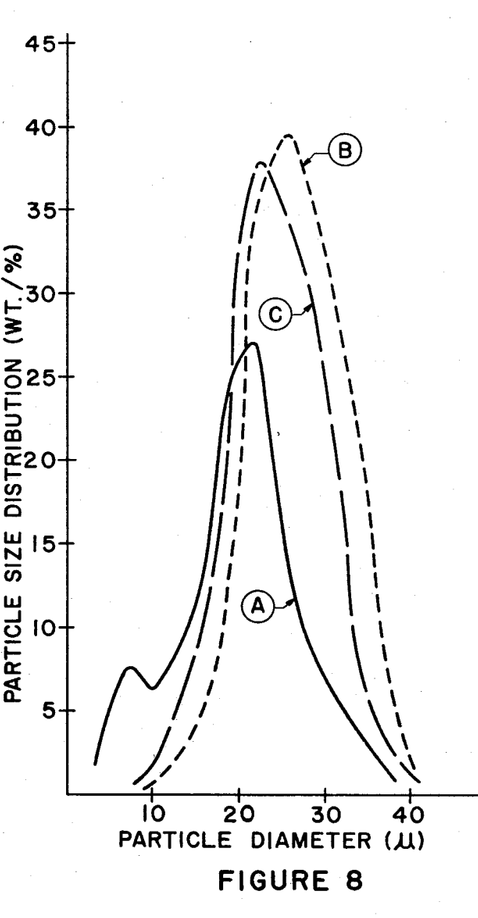
FIG. 8 is a graph comparing particle size distribution of arrowroot starch with ordinary prime grade wheat starch and with the special large granule wheat starch of the invention.

FIG. 8 of the attached drawings is a graphic illustration of particle size distribution by weight, and compares the particle size distribution in a typical, prime grade wheat, Sample A, with an arrowroot starch, Sample B, and the large granule wheat starch of the invention, Sample C. Most striking in FIG. 8 is the almost identical particle size distribution exhibited by Sample C, applicants' new large granule wheat starch, with that of Sample B, the extremely scarce and expensive arrowroot starch.

The dramatic improvement attained in particle size distribution by applicants' new large granule wheat starch over typical prime grade wheat starch can be readily appreciated when the curve for Sample A is compared to the curve for Sample C. Sample A contained only about 21% by weight of starch granules which were 22 microns, or larger, whereas Sample C contained more than 55% by weight 22 micron starch granules, or larger.

The particle size distribution analyses were obtained by the use of a Coulter Counter, following the procedures generally outlined in the Instruction Manual for Coulter Counter Industrial Model A. The Coulter Counter and Instruction Manual were obtained from Coulter Electronics Industrial Division, 2525 N. Sheffield Avenue, Chicago, Illinois, and this equipment and its operation are described in U.S. Pat. Nos. 2,656,508, 2,869,078, 2,985,830, and 3,015,775 as well as other publications.

The Coulter Counter determines the number and size of particles suspended in an electrically conductive liquid by forcing the suspension to flow through a small aperture having an immersed electrode on each side thereof. As a particle passes through the aperture, it changes the resistance between the electrodes, producing a voltage pulse of a magnitude proportional to the particle volume. The series of pulses so produced is electronically scaled and counted, and this data is analyzed to produce the information for the particle size distribution graphs for each sample, and which are set forth compositely in FIG. 8 of the drawings.

The Instruction Manual lists particular apparatus for use with the Coulter Counter, Model A. For the subject measurements, the aperture used was 140 microns. A gain setting of 6 was used. A two-speed Waring Blendor with a semi-micro container (Cenco 17246-2) was used, along with the following equipment:
 a. filter holder (Millipore XX10 047 00);
 b. filters, 0.45 micron (Millipore HAWP 047 00);
 c. 180 ml. electrolytic beakers (LaPine 20-81);
 d. stirrer, air-driven (A. H. Thomas 9224) with glass stirring rod, to replace the electric stirrer;
 e. Voltmeter, Triplett Elec. Instrument Company, Bluffton, Ohio, Model 625-NA.

The reagents used include a first reagent comprising 2% sodium chloride solution which comprises 40 grams NaCl and 2 ml of 37% formaldehyde in sufficient distilled water to make 2 liters of solution. This first reagent provides the electrolyte conducting media in which the particles to be observed are suspended. The second reagent used is Triton X-100, a wetting agent made by Rohm & Haas, and is used to keep the particles suspended during actual counting of a sample.

To calibrate the equipment to insure an accurate count, and to identify starch particles accurately according to size, ragweed pollen was used, and the general calibration procedure as set forth in the Coulter Counter Instruction Manual was followed. Ragweed pollen was chosen for the calibration step because these particles are quite uniform in size, and average about 20 microns, which is about in the middle of the size range which was to be measured for the preparation of FIG. 8 of the drawings. Isopropanol was used to wet the ragweed pollen prior to mixing the sample with the electrolyte solution. In the actual counting runs, Triton X-100 was used to maintain thorough dispersion of the starch granules after first dispersing the sample in the electrolyte. During calibration, the ragweed pollen must be handled carefully, considering possible allergy problems.

Procedures are set forth in the Instruction Manual for analyzing the Coulter Counter data, and the raw data can be readily adapted to computer program sorting and analysis, so that an extremely accurate count of particles can be made in a particular sample, along with an accurate characterization of these particles by size.

Coulter Counter analysis of large granule starch samples made according to the general method of the invention has made possible a very specific degree of adjustment in the process parameters to obtain a large granule product of consistently good quality. Particular starch samples can be analyzed with the Coulter Counter and appropriate computer programs to determine whether the sample has the required number of large particles in excess of 22 microns in size.

The large granule starch product of the invention can be subjected to further modifications, such as etherification, esterification, enzyme hydrolysis, and cross-linking, and to any combination of these. In certain applications, where a lower viscosity product is desired, the large granule starch may be oxidized, and also modified as described if additional changes are desired. A hydrochloric acid-modified epichlorohydrin crosslinked product exhibited increased heat stability, the pasting temperature being raised about 6°C.

BRABENDER AMYLOGRAPH COMPARISONS

The large granule wheat starch product has been compared to prime grade wheat starch and to the small granule wheat starch by-product for viscosity characteristics. The results of this comparison are illustrated graphically in FIG. 9 of the drawings. Three slurry Samples, A, C and D, were prepared, each having 8% solids, dry substance basis. Each sample was subjected to the same conditions and the respective viscosity behaviors were measured during heating, holding at a constant temperature, and during cooling for the time periods and at the temperatures and rates indicated in FIG. 9.

Figure 9:
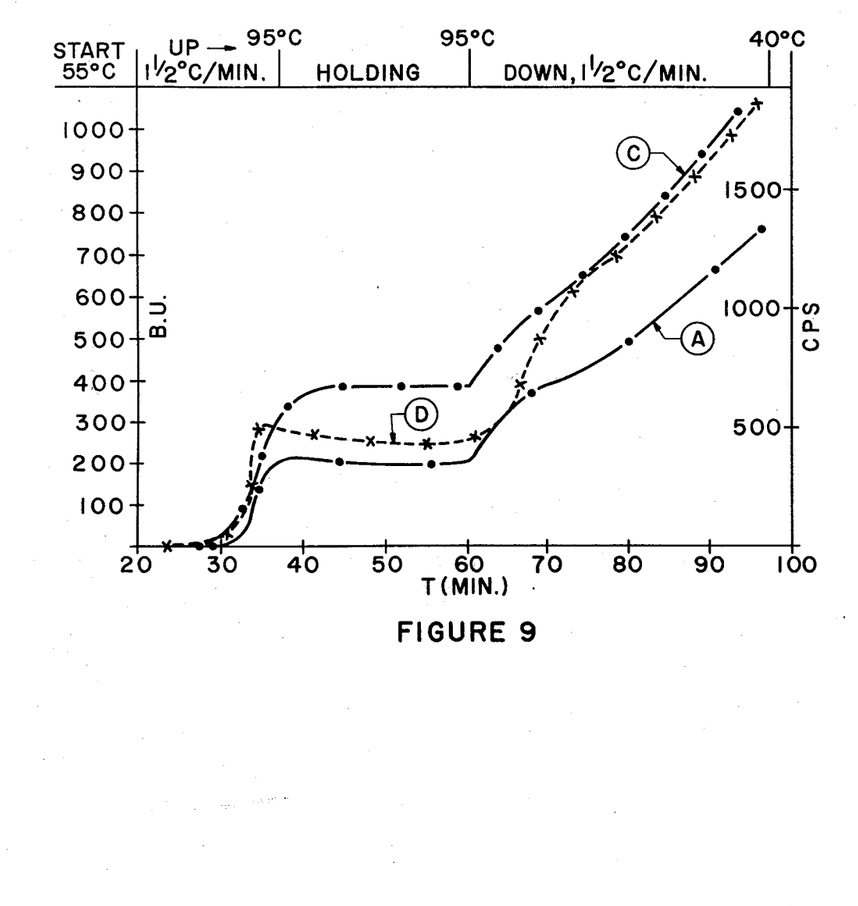
FIG. 9 is a graph comparing the effect of heating on the viscosity of wheat starch slurries of prime grade wheat starch and the small granule wheat starch and the large granule wheat starch of the invention.

The prime grade native wheat starch, Sample A, containing a normal mixture of both large and small starch granules, rose in viscosity during heating up to about 200 Brabender Units (B.U.), but did not increase further in viscosity until cooling was commenced at 60 minutes into the test. Viscosity for Sample A then rises at a constant rate to a maximum of about 770 B.U. at about 96.5 minutes into the run, or after about 36.5 minutes of cooling. The temperature of the sample at this point has been lowered to about 40°C.

The small granule starch, Sample D, which was collected as a by-product from the method of the invention, exhibited an interesting and somewhat better viscosity behavior under the same test conditions. After about 34.5 minutes heating, viscosity reached a level of about 280 B.U. When the sample was held at 95°C. for approximately the next 25 minutes, viscosity decreased very gradually to about 225 B.U., and upon cooling, Sample D quickly increased to a viscosity of 655 B.U. after only fifteen minutes cooling, and thereafter, the viscosity steadily increased to about 1,070 B.U. at the end of the cooling period, or 96.5 minutes into the run.

The large granule starch, Sample C, made according to the invention, performed very similarly to Sample D during the last 20 minutes of cooling. It reached a higher viscosity level sooner than either Sample D or A, and maintained a higher level than either Sample D or A throughout the test. After the initial heating period, and at 40 minutes into the test, Sample C had already reached a viscosity of about 375 B.U., and never dropped below this level. During the "hold" period at 95°C., the viscosity of Sample C continued to increase slightly to 390 B.U. at 60 minutes into the run. When Sample C was cooled, it commenced a very regular rate of increase in viscosity up to about 1,100 B.U. at the end of the test run.

The comparisons illustrated in FIG. 9 definitely show an improved viscosity performance not only for the small granule starch by-product of the invention, but especially for the large granule product. Ordinary prime grade wheat starch, containing both large and small starch granules in the normal amounts and proportions *never* attained a viscosity more than 800 B.U. during the tests, while both the small granule starch and the large granule starch made according to the invention attained viscosities in excess of 1,000 B.U.

CROSS-LINKED PRODUCT

Figure 5:
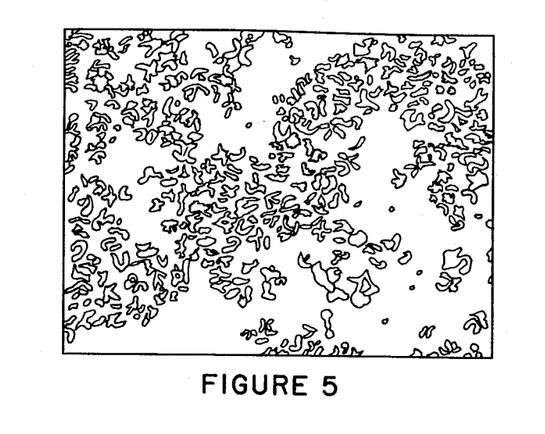
FIG. 5 is a sketch made from a photomicrograph enlarged 100X of the large granule wheat starch after being heated at 90°C. for 40 minutes.
Figure 6:
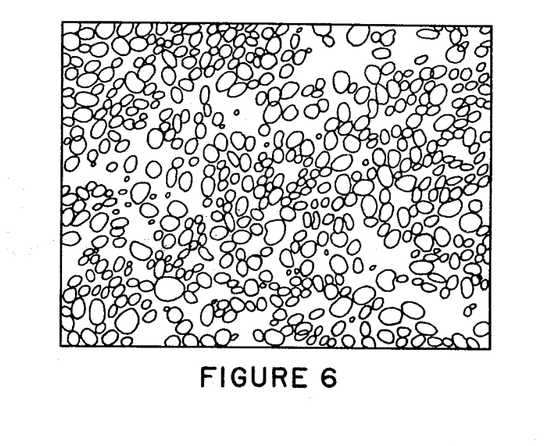
FIG. 6 is a sketch made from a photomicrograph enlarged 100X showing a sample of urea-formaldehyde cross-linked large granule wheat starch after heating at 90°C. for forty minutes.

Additional improvements in the large granule product of the invention can be obtained by further modification of the starch. FIGS. 5 and 6 of the drawings illustrate dramatically the striking improvement obtained by cross-linking the large granule starch with urea formaldehyde. FIG. 5 shows the effect on the starch granules caused by heating the product at 90°C. for 40 minutes. It can be seen that the granules have fragmented, and are no longer intact. The granules shown in FIG. 6, which have been cross-linked with urea-formaldehyde, are intact and homogeneous, with well defined "roundness". The sample in FIG. 6 had been subjected to the identical heating conditions of 90°C. for 40 minutes. It is clear from the illustrated results of these tests that the particular modifications to the large granule product effected by crosslinking substantially improved its heat resistance, making the product even more useful in those carbonless duplicating paper coating processes which are performed at elevated temperatures.

These same samples were observed under a Kofler Hot Stage microscope to determine the temperature at which 100% of the granules lose birefringence. The samples were also observed for gelatinization point using an amylograph. The gelatinization point temperature recorded was that temperature at which the granules began to paste, thereby increasing Brabender viscosity. The following data was recorded:

| | Kofler Hot Stage (100% loss of birefringence) | Brabender Amylograph GP |
| --- | --- | --- |
| large granule | 62°C. | 82–85°C. Product pastes |
| cross linked large granule | 68°C. | No pasting |

The small degree of urea formaldehyde cross-linking used raised the gelatinization point temperature 6°C., as observed on the Kofler Hot Stage microscope. The amylograph comparison was even more dramatic. The large granule sample which had *not* been subjected to cross-linking showed evidence of pasting at a temperature of 82°–85°C. The cross-linked product showed no evidence of pasting when subjected to the same conditions.

It is contemplated that other cross-linking reagents, such as epichlorohydrin, acetaldehyde, urea-formaldehyde in ratios ranging from 30–50% by weight of urea to 30–50% formaldehyde, could also be used. Best results were obtained, however, using a urea-formaldehyde-water reagent mixture of the ratio (29:59:15). This latter reagent mixture proved most adaptable to the manufacturing process, and is the easiest to handle. It is available from E. I. duPont, Inc., designated as "UF 85".

The amount of cross-linking was controlled by monitoring the alkali fluidity of the reaction mixture containing the cross-linking agent and starch dispersion, and by neutralizing with sulfuric acid as soon as an alkali fluidity range from about 49–76 ml. measured on a 2.5 gm. starch d.s.b., in a 100 ml. solution is obtained. The presently preferred alkali fluidity on a 2.5 gm. sample is about 59. The reaction is stopped at this point, since it has been found that this particular degree of crosslinking will inhibit the starch product sufficiently to give sufficient heat stability to the cross-linked granules for them to retain their shape at the elevated temperature required during the carbonless paper coating process.

The alkali fluidity test referred to immediately above is presently considered the most convenient means of controlling the degree of cross-linking. The test is generally described in U.S. Pat. No. 3,238,193 at columns 7 and 8, lines 40–61 and 1–9, respectively. The concentration of the alkali starch dispersion for a particular test sample is determined by adding 90 ml. of 0.25 N sodium hydroxide to a slurry of neutralized, filtered, water-washed wet starch cake containing 2.5 grams of the cross-linked starch derivative, dry solids basis (d.s.b.). The starch sample is slurried in water to make 10 ml. of total water prior to the addition of 90 ml. of 0.25 N sodium hydroxide. After mixing the starch slurry with the sodium hydroxide solution, the suspension is stirred at between 450 and 460 rpm. for 3 minutes in order to paste the starch. The resulting starch solution is poured into a fluidity funnel having a specific water time between about 30 and 40 seconds. The number of ml. of starch solution which flows through the funnel in the "water-time" (defined below) is the alkali fluidity of the starch. The extent of cross-linking is monitored by repeating the above test at regular intervals with samples taken from the reaction mixture. When the alkali fluidity test is within the desired range, the cross-linking reaction is stopped.

The fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a 60° angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the "water-time" of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height for the lower end of the funnel body passage to the lower external orifice of the funnel tip includes the height of the ball chamber (0.1008 inches) and the length (0.0492 inches) of the funnel tip opening.

The composite apparatus described above is vertically disposed above a graduated cylinder for the actual tests. At the beginning of each test, the "water-time" for the apparatus is checked by running 100 ml. of pure water through the funnel and recording the total elapsed time. The "water-time" then becomes the time against which each sample is tested.

The flow through the funnel during the "water-time" is measured in milliliters and recorded after each test. The funnel is thoroughly washed between each test to avoid irregular observations. Other starch concentrations may be used, as indicated, for the tests. For example, in some instances it is desirable to use a 5 or 10 g., dry substance basis sample. In such cases, 0.375 N sodium hydroxide is used. Otherwise the equipment and the procedure is the same.

The large granule starch and cross-linked large granule starch of the invention both exhibited sub-sieve values considerably higher than prime grade and comparably cross-linked prime grade wheat starch, as is shown below:

TABLE I

| Particular Starch | Sub-Sieve Value (microns) |
|---|---|
| Large granule wheat starch | 19.1 |
| Cross-linked, large granule wheat starch | 20.8 |
| Prime grade wheat starch | 10.8 |
| Cross-linked, prime grade wheat starch | 10.2 |

The equipment used to obtain the above sub-sieve values was a Fisher Model 95 Sub-Sieve Sizer, available from Fisher Scientific Co., Inc., Instrument Division, Pittsburgh, Pennsylvania. When operated according to the instructions supplied, this instrument provides quick and reproducible measurements of average particle sizes in the 0.2 to 50 micron range (Fisher Instruction Manual, Instrument Division, Catalog Number 14-311). Each measurement is read directly from the curve on the Calculator Chart located at the top half of the instrument. Air permeability is measured and converted to average particle size, based on the principle that air flows more readily through a bed of coarse powder than through an otherwise equal bed of fine powder that is equal in shape of bed, apparent volume, and percentage of voids. Measurements of average particle size are obtained by reason of difference in general coarseness of materials, that is, differences in average pore diameter and total interstitial surface. Although based on complex formulas, the standarization of conditions by Ernest L. Gooden and Charles M. Smith have made it possible to obtain a direct reading of average particle size of a sample from the instrument without mathematical computation, Gooden, E. L. & Smith, Charles M., Industrial Engineering Chemistry Analytical Edition 12:479–482 (1940).

COMPARATIVE ANALYSIS

The large and small granule products made according to the invention were compared to prime grade wheat starch for protein, ash, water solubles, film and fat content with the following results:

TABLE II

ANALYSIS - DRY BASIS - WT. PER CENT OF TOTAL STARCH SAMPLE

| | Large Granule Starch | Small Granule Starch | Prime Grade Wheat Starch |
|---|---|---|---|
| Protein | .28 | 1.11 | 0.47 |
| Ash | .138 | 0.233 | 0.221 |
| Water Solubles (carbohydrates) | 0.00 | 1.32 | 1.82 |
| Fibers Cellulose fiber (Wheat hull remnants) | 0.07 | 0.16 | 0.08 |
| Fats (ether extraction only) | 0.01 | 0.17 | 0.18 |

The above analyses show most clearly that the protein content of the prime grade wheat starch is primarily with the small granule portion. The protein content of the small granule fraction is more than double that of prime grade wheat, whereas the protein content of the large granule fraction is only about 60% of that for prime grade wheat. Ash content of the prime grade wheat is more than one and one-half times that of the large granule starch product of the invention.

Most notable in this analysis was the complete absence of detectable water soluble carbohydrates from the large granule starch product of the invention. The ether extracted fat content of the large granule starch was only 0.01 per cent as compared to 0.17 and 0.18 per cent, respectively, for the small granule starch and prime grade wheat starch samples.

OXIDATION EFFECT — COMPARATIVE TESTS

In another comparison, prime grade wheat strength, large granule wheat starch and small granule wheat starch were all slurried and then oxidized by the following methods to compare oxidation ability of each as starting materials for routine products. The oxidation procedures used were as set forth below:

1) Low pH: Slurry → Addition of NaOCl →
   (7 g) pH 2.5–3.0    at 3% level (Cl$_2$/Starch)
   3 hr. →  Neutralize → Dry
   oxidation  with
              Na$_2$SO$_3$ 2) High pH: Slurry → pH to 8.5 → Addition →
   (5 g) pH   with 18%  of NaOCL
              Soda ash   at 2.5% level
                         (Cl$_2$/Starch)
   3 hr. →  Neutralize → Dry
   oxidation  with
              Na$_2$SO$_3$ Viscosity measurements were carried out on the above samples using an Ostwald-Fenske Viscometer, Model 200, with a constant speed stirrer adjusted to 100–200

RPM. A constant temperature water bath of 40°C., plus or minus 1°C. was used. All reagents and glassware are also stabilized at the same temperature. A stopwatch having 0.1 second graduations is used for timing the tests. A 0.50 N NaOH solution is used to make up the starch-alkali suspensions to be tested.

The test procedure used was generally as follows:
1. The six samples to be tested (3 low pH and 3 high pH) were all first weighed to make up 7 g, dry basis, in each sample;
2. The sample was then placed in a 250 ml beaker;
3. 10 mls. of distilled water was added to the beaker and stirred until water-starch paste was completely smooth;
4. The beaker was then placed in water bath at 40°C. and agitated with constant speed stirrer at 100–200 RPM;
5. 90 mls of 0.5N NaOH was added, and the stopwatch was started;
6. The starch-alkali suspension was stirred until completely lump free for a period ranging from 3–7 minutes;
7. Then 10 mls of the lump-free starch-alkali suspension is transferred from the sample to the Ostwald-Fenske Viscometer using a 10 ml pipet;
8. The sample is drawn up into the calibrated limb of the Viscometer, and is held there for 9 minutes before timing flow from upper to lower mark;
9. The sample is released against the stopwatch, and time of flow for the sample is recorded.

The viscosity in seconds is the time it takes the sample to flow between the marks.

The results of the tests for the six samples of oxidized starch were as follows:

TABLE III

| SAMPLE | Viscosity in seconds | |
|---|---|---|
| | Low pH* | High pH** |
| Ao - Prime Grade Wheat Starch - Oxidized | 30 | 32 |
| Co - Large Granule Wheat Starch - Oxidized | 22 | 20 |
| Do - Small Granule Wheat Starch - Oxidized | 45 | 50 |

*i.e. 7 grams of the dry product = 30 second flow time under the described conditions for regular starch.
**i.e. 5 grams of the dry product = 31 seconds as noted.

It can be seen from Table III that a difference in halogen oxidation rate efficiency exists. The large granule starch product (Sample Co) of the invention was thinned by oxidation considerably more than either prime grade wheat starch (Sample Ao) or the small granule starch by-product of the invention (Sample Do). The lower viscosity number indicates a lower viscosity for the sample tested, and Sample Co was lowest at both pH 2.5–3.0 and pH 8.5. Sample Do retained a relatively high viscosity, even after oxidation, indicating relatively little thinning effect from the oxidation procedure, with a little change noted from changing the pH. The granule size apparently has an effect on the halogen oxidation rate, with the large granule starch (Sample Co) showing the best rate.

PROCESS AND PROCESS EQUIPMENT

Figure 7:
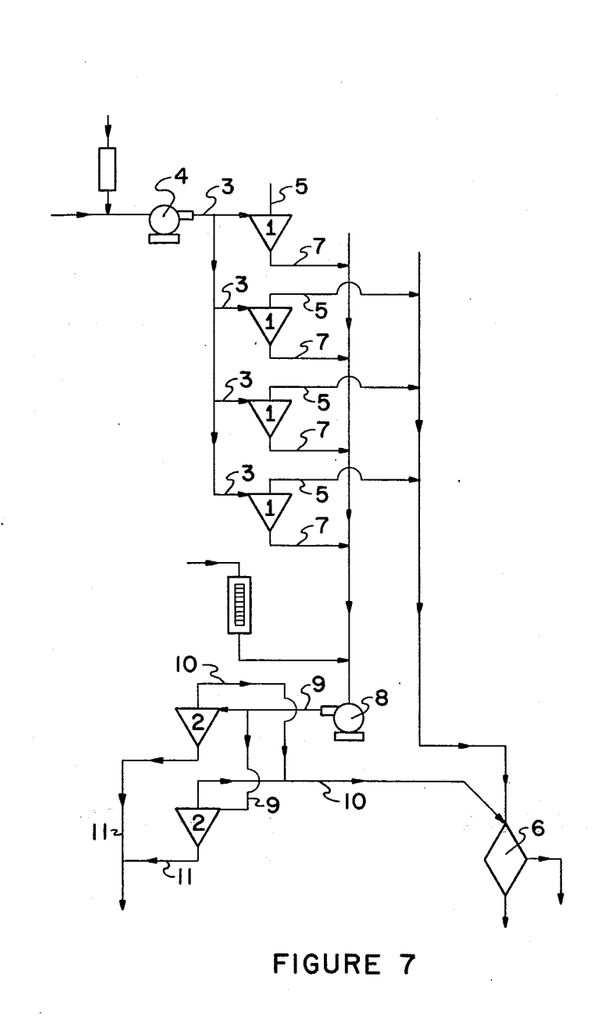
FIG. 7 is a general schematic diagram showing the process steps to obtain the starch products of the invention.

The process system for obtaining the large granule starch of the invention is shown schematically in FIG. 7 of the drawings. The most important component in the system are hydrocyclones 1 and 2. In the preferred system, the hydrocyclones 1 and 2 are all identical, and have the following dimensions:

| | |
|---|---|
| a) diameter, cylindrical section | 1.02" |
| b) height, cylindrical section | 19/32" |
| c) diameter, feed aperture | 3/16" |
| d) diameter, vortex finder | 21/64" |
| e) length, vortex finder inside hydrocyclone | 7/8" |
| f) diameter, discharge aperture | .350" |
| g) apex angle | 16° |

A Type "P", Doxie Impurity Eliminator having the above dimensions is available from Dorr-Oliver, Inc., Stamford, Connecticut and has been used successfully in the system of the invention. It is contemplated that various changes in dimensions could be made provided that other compensating steps are taken. For example, if a higher feed pressure were used, it may be possible to use somewhat larger hydrocyclones. A smaller hydrocyclone would be expected to perform better at decreased feed pressure. It is also possible to use different sized hydrocyclones for first pass separation than those used for the second pass separation step.

For best results, it has been found that at least two hydrocylones 1 and 2 should be arranged in series, as shown in FIG. 7, so that input line 3 enters the feed aperture of hydrocyclone 1 to supply prime grade liquid starch slurry feed under pressure to the natural vortex flow inside the hydrocyclone 1. The preferred feed solids level which has given best results is at about 7.5° Be. The feed to hydrocyclone 1 must be prime grade native colloid wheat starch slurry which is substantially free of fiber and gluten. As mentioned previously, the system does not operate well on reslurried prime grade starch granules which have been dried. There is apparently a change in hydration capacity caused by the drying process, and which hinders the separation effect in the hydrocyclones.

The prime grade, native colloid wheat starch slurry provided as feed to the system may be the product of the well known "batter process" for producing wheat starch. Such a system is described at page 58 of Whistler et al., Vol. II, op. cit., and various other publications, including U.S. Pat. Nos. 2,453,310, 2,504,962, 2,517,149 and 2,537,811. There are many variations of the starch milling process, but the important requirements of the feed to the process system of the invention is that it be in native colloid slurry form, containing only prime grade starch, and that it be substantially free of other matter, such as salts, gluten and fiber which tend to interfere with the separating effect of the hydrocyclones. If the feed slurry is not at the desired solids level, it is either concentrated or diluted as necessary to bring the solids level to about 7.5° Be. (13.55% solids, d.b.). Pump 4 provides a feed pressure input of about 150–210 psig. This input feed pressure can be increased, with some improvement in large granule concentration noted with increasing feed pressure. Availability of equipment, electrical power costs and other similar considerations, including desired yield will influence the extent of increase in pump capacity considered feasible.

The overflow output line 5 carries the small granule by-product of the invention to a DeLaval centrifuge 6, where it is dewatered. The small granule product can then be filtered, washed and then dried in the conventional manner. The small granule product contains starch granules which are substantially all smaller than 12 microns.

The underflow output line 7 from the hydrocyclone 1 is maintained at a solids level of about 19.0°–19.6° Be. (34.31% solids, d.b.). This partially separated slurry is then diluted with water to a solids level of about 7.4°–7.6° Be. (13.55% solids d.b.) ahead of second pass feed pump 8. The partially separated, diluted slurry is then pumped as input feed to hydrocyclones 2 through second pass input feed line 9. The input feed pressure is maintained at about 150–210 psig, with the preference being for a feed pressure of about 200 psig.

The separation process is repeated in the hydrocyclones 2 to produce an overflow through lines 10 which includes substantially all the remaining starch granules less than 12 microns in size. The underflow output from hydrocyclones 2 is throttled to maintain the underflow density at about 19.0°–19.6° Be. (34.31% solids, d.b.).

This underflow output slurry from hydrocyclones 2 contains the large granule starch product of the invention, from which substantially all the small granules have been removed. The large granule output slurry is collected through line 11, and then "finished" in the normal manner. The finishing steps may include coarse screening, filtering, and drying. The dry cake may be ground in a Jeffrey mill, taking care to avoid fragmenting the granules.

Figure 2:
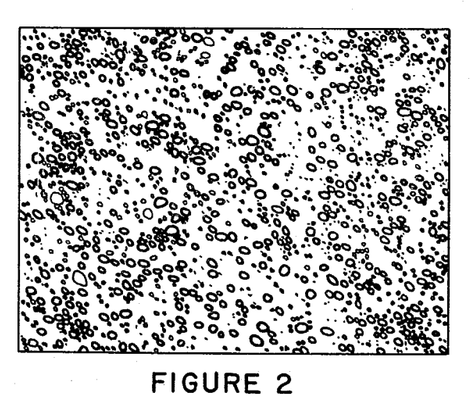
FIG. 2 is a sketch made from a photomicrograph enlarged 100X showing typical prime grade wheat starch granules and contains starch granules ranging in size from 3 to 40 microns.
Figure 3:
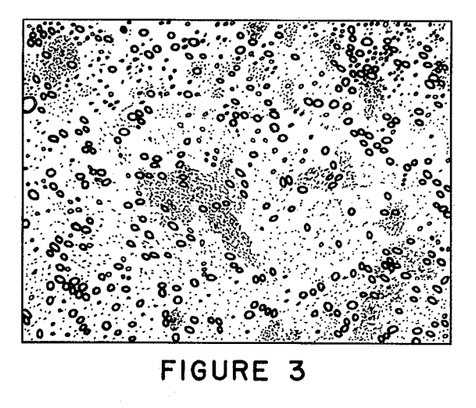
FIG. 3 is a sketch made from a photomicrograph enlarged 100X showing the concentrated small granule starch fraction in which most of the particles are less than 12 microns.

The dried, large granule starch product of the invention appears substantially as shown in FIG. 4 of the drawings. As can be seen, this product comprises substantially more large granules than the starting prime grade starch shown in FIG. 2 of the drawing. Also, comparison of FIG. 4 to FIG. 3 shows very clearly the striking difference in granule size between the small granule by-product and the large granule product.

The large granule product was further modified as follows:

CROSS-LINKING PROCESS

The urea-formaldehyde-water (UF-85) mixture having a parts ratio of 29:59:15, in the order listed above, was used to cross-link the large granule starch product. The starch product was first slurried to a solids level of about 20°–23° Be. and the pH was adjusted to about 2.8–3.0 with concentrated HCl. The UF-85 cross-linker is then added to the slurry at about 0.7% by weight level and the reaction is allowed to proceed at room temperature for 3 hours. The pH is then adjusted to 5.5–6.0 with a 14–18% by weight solution of soda ash. The slurry is then diluted to 12°–15° Be. and dried. The cross-linked, large granule starch product made as above exhibited greater heat resistance than the comparable large granule product without cross-linking. These cross-linked large granules retained their shapes with *no* pasting after being heated at 90°C. for 40 minutes, as shown in FIG. 6 of the drawings. This added heat resistance makes the cross-linked product useful for additional duplicating paper coating operations which include higher temperature steps that destroy the unmodified large granules.

OXIDIZED, CROSS-LINKED PRODUCT

A combination of the cross-linking process described immediately above with the oxidation process described earlier has proved to be useful in improving the properties of the large granule starch of the invention, beyond the effects obtained with either modification alone. The oxidized, cross-linked product was prepared generally as follows:

|  | (a) | (b) | (c) |
|---|---|---|---|
| Large granule wheat starch →→→ Slurry | oxidized at acid pH, at 3 →→→ using NaOCl, .04% (Cl₂/starch) Time 2 hrs. | cross linked using "UF-85" →→→ (1.6% by wt., d.s.b.) Time 3 hrs. | adjusted pH to 5.5 with Na₂CO₃ |

After cross-linking, the product is filtered, washed, and dried. Tests were conducted in making carbonless duplicating paper comparing the oxidized, cross-linked large granule product with arrowroot starch, the large granule, unmodified product, and with the large granule, oxidized in such as the sample designated Sample Co, described earlier. The samples were used to coat the duplicating paper in a process in which the starch particles are subjected to sustained heating of about 150°F. for about 2 hours. The respective samples were then observed for "smudge" values, which is an optical observation of the extent of protection during handling given by the starch particles to the micro-encapsulated ink particles in the paper coating. The oxidized cross-linked large granule product described above performed satisfactorily inn these comparisons, and just as well as arrowroot, and is an ideal replacement for it.

SUMMARY

The new large granule cereal starch product of the invention, the small granule cereal starch by-product, and the modified large granule cereal starch product of the invention are each useful in a number of special applications in which cereal starch was not formerly considered useful. The invention allows the use of a plentiful cereal starch such as wheat, barley or rye as a replacement for the very scarce and expensive arrowroot starch, especially in applications such as antioffset lithography powders and carbonless duplicating paper where the granule shape and size is important.

Wheat, barley and rye starches have a natural distribution of larger granules ranging above 30 microns in size and small granules below 10 microns, with few intermediate size granules. The large granules of these particular native cereal starches are uniformly round in shape, similar in size and appearance to arrowroot starch granules. The annual world production for these cereal grains from which these starches are made is approximately:

| | |
|---|---|
| Wheat | 11,342,000,000 bushels (1970) |
| Barley | 5,088,000,000 bushels (1970) |
| Rye | 1,500,000,000 bushels (1966) |

Arrowroot is scarce, and much more expensive then the above starches, so the product and process of the invention provides an inexpensive and readily abundant substitute for arrowroot starch. The invention is made possible by the important discovery that it is necessary to perform the separation process using hydrocyclones on native colloid prime grade starch slurry which is free as possible of other matter such as salt, fiber and gluten, and which has not been dried subsequent to the wet milling process. It has also been found, especially when wheat starch is being processed, that the separation process should be carried out through a first pass hydrocyclone and a second pass hydrocyclone utilizing the partially separated underflow from the first pass hydrocyclone as the feed input to the second hydrocyclone.

The hydrocyclones are carefully selected for all dimensions, and have no moving parts. Separation is a function of solids level (density) of the input feed to the hydrocyclones, the input pressure, and the throttling balance of the overflow and underflow. For the most desirable size separation which will give a product having at least 55% by weight of its granules larger than 22 microns, the input solids level of the feed to the first and second pass hydrocyclones should be maintained at about 7.5° Be., and the liquid pump pressure in the feed line should be maintained at about 170–210 psig.

The method of the invention will give a large granule product which will compare to arrowroot in particle sizes as follows:

TABLE IV

| Large Granule Wheat Starch | | Arrowroot | |
|---|---|---|---|
| By wt. % | Size | By wt. % | Size |
| 25 | 28 microns, and larger | 25 | 30 microns, and larger |
| 50 | 24 microns, and larger | 50 | 26 microns, and larger |
| 75 | 20 microns, and larger | 75 | 23 microns, and larger |

Various modes of carrying out the invention are believed to be within the scope of the following claims.

We claim:

1. An improved large granule cereal starch product selected from the group consisting of wheat, barley and rye, in which about 22% of the total number of granules are at least 22 microns in size, about 99% by weight of the granules are at least 12 microns in size, said starch product being cross-linked to increase the heat stability of the starch granules.

2. The product of claim 1, in which the starch is prime grade wheat starch derived from a continuous wet batter process from which a native colloid starch slurry is obtained, and is then subjected to hydrocyclonic separation.

3. The product of claim 2, in which at least 55% by weight of the granules are larger than 22 microns, and the granules remain intact when heated at a temperature of 90°C. for about 40 minutes.

4. The product of claim 1, in which the starch granules have been cross-linked with urea-formaldehyde.

5. The product of claim 4, in which the starch granules are also oxidized.

6. The starch product of claim 4, in which the starch granules are oxidized with sodium hypochlorite.

7. The starch product of claim 5, in which the gelatinization temperature of thhe granules is approximately 6°C. higher than the gelatinization temperature of the unmodified large granule wheat starch as evidenced by loss of birefringence when observed under a Kofler hot stage microscope.

8. The starch product of claim 7, in which the temperature at which loss of birefringence occurs in the oxidized, cross-linked product is about 68°C.

9. An improved, large granule cereal starch product selected from the group of wheat, barley or rye, in which at least about 22% of the total number of granules are at least 22 microns in size, about 99% by weight of the granules are at least 12 microns in size, and the starch has been subjected to cross-linking with epichlorohydrin to increase the heat stability of the starch granules.

10. The starch product of claim 9, in which the starch has also been oxidized.

11. An improved, large granule cereal starch product selected from the group consisting of wheat, barley or rye starches said starch comprising at least 99% by weight granules at least 12 microns in size, said starch being substantially free of water soluble carbohydrates and containing less than about 0.01% ether extractible fats, said starch having been further modified by cross-linking with urea-formaldehyde or epichlorohydrin.

12. The product of claim 11, which has also been oxidized with sodium hydrochlorite to a level of oxidation which in combination with said cross-linking, increases the gelatinizatin temperature of the product about 6°C. over the gelatinization temperature of the unmodified large granule starch.

13. An improved, large granule cereal starch product selected from the group consisting of wheat, barley or rye starches, said starch comprising at least 22% granules which are 22 microns in size or larger, and said starch having been further modified by oxidation with sodium hypochlorite and cross-linking with urea-formaldehyde so that a 2.5 gm sample of said starch has an alkali fluidity of about 49–69.

14. The starch product of claim 13, in which the starch is wheat, and the product exhibits a gelatinization temperature about 6°C. higher than a comparable sample of the unmodified large granule wheat starch from which it is derived.

* * * * *